United States Patent
Bernzen et al.

(10) Patent No.: US 8,019,509 B2
(45) Date of Patent: Sep. 13, 2011

(54) METHOD AND DEVICE FOR ACTUATING A VEHICLE OCCUPANT PROTECTION MEANS

(75) Inventors: Werner Bernzen, Ehningen (DE); Dominic Reutter, Notzingen (DE)

(73) Assignee: Daimler AG, Stuttgart (DE)

( * ) Notice: Subject to any disclaimer, the term of this patent is extended or adjusted under 35 U.S.C. 154(b) by 790 days.

(21) Appl. No.: 11/914,716

(22) PCT Filed: May 16, 2006

(86) PCT No.: PCT/EP2006/004592
§ 371 (c)(1),
(2), (4) Date: May 13, 2008

(87) PCT Pub. No.: WO2006/122742
PCT Pub. Date: Nov. 23, 2006

(65) Prior Publication Data
US 2008/0221758 A1    Sep. 11, 2008

(30) Foreign Application Priority Data
May 19, 2005 (DE) .......................... 10 2005 022 997

(51) Int. Cl.
*B60R 21/13* (2006.01)
*B60R 21/01* (2006.01)
*B60R 22/46* (2006.01)

(52) U.S. Cl. .......................................... 701/45; 280/806

(58) Field of Classification Search .................. 180/268; 280/806; 701/45, 46
See application file for complete search history.

(56) References Cited

U.S. PATENT DOCUMENTS

| 7,178,622 B2 * | 2/2007 | Eberle et al. ................ 180/271 |
| 7,668,633 B2 * | 2/2010 | Diebold et al. ............... 701/36 |
| 2001/0054816 A1 * | 12/2001 | Brambilla et al. ........... 280/806 |
| 2004/0056471 A1 * | 3/2004 | Bullinger et al. ............ 280/806 |
| 2005/0139408 A1 * | 6/2005 | Bullinger et al. ............ 180/268 |
| 2005/0252710 A1 * | 11/2005 | Akaba et al. ................ 180/268 |

FOREIGN PATENT DOCUMENTS
DE    101 21 386 C1    8/2002
WO    WO 2004/085220 A1    10/2004

OTHER PUBLICATIONS

International Search Report dated Aug. 24, 2006 and Form PCT/ISA/237 with English translation of relevant portions (Fourteen (14) Pages).

* cited by examiner

*Primary Examiner* — Ruth Ilan
(74) *Attorney, Agent, or Firm* — Crowell & Moring LLP

(57) ABSTRACT

A method and apparatus for preventatively actuating a vehicle occupant protection system in a vehicle having a sensor system which acquires driving state data, and a reversible vehicle occupant protection means which can be triggered before the collision time and thus moved into an operative position. A control signal for triggering the vehicle occupant protection means is activated if at least one critical driving state is present, and is deactivated if the respective critical driving state ends and as a function of at least one further condition which represents at least one sensed controllable driving behavior. As a result, the vehicle occupant protection system is reset to its initial state.

13 Claims, 1 Drawing Sheet

METHOD AND DEVICE FOR ACTUATING A VEHICLE OCCUPANT PROTECTION MEANS

This application is a national stage of PCT International Application No. PCT/EP2006/004592, filed May 16, 2006, which claims priority under 35 U.S.C. §119 to German Patent Application No. 10 2005 022 997.2, filed May 19, 2005, the disclosure of which is expressly incorporated by reference herein.

BACKGROUND AND SUMMARY OF THE INVENTION

The present invention relates to a method and apparatus for actuating a reversible vehicle occupant protection device in a vehicle having a sensor system which senses driving state data, and a reversible vehicle occupant protection device which can be triggered (and thus moved into an operative position) before a collision occurs. In such systems, a control signal for triggering the vehicle occupant protection device is activated if a critical driving state or a critical driving situation is present, and is deactivated if the critical state of the vehicle ends.

A critical driving situation or driving state is understood to mean, for example, an emergency braking operation or oversteering or understeering of the vehicle, for example skidding of the vehicle. In such critical situations, preventative measures for protecting vehicle occupants are activated and deactivated again when the danger has passed. The information for identifying a critical situation and for initiating preventative measures is supplied by sensors such as, for example, those which are included in a braking assistant or of a vehicle movement dynamics control system. Such systems can perform early detection of critical driving situations such as skidding or emergency braking of the vehicle, and can generate or set a control signal, such as a software flag or a status bit, preventatively pretensioning a reversible seat belt pretensioner.

German patent document DE 101 21 386 C1, for example, discloses a method for actuating a reversible vehicle occupant protection means in a motor vehicle having a driving state sensor system which senses driving state data, and a reversible vehicle occupant protection means that can be triggered, and thus moved into an operative position before a collision occurs. The driving state data are monitored for a state of "emergency braking", and if a state of "emergency braking" is detected the vehicle occupant protection means is actuated. The data processing device also detects a state of "oversteering" and a state of "understeering". If such a state of "emergency braking" and/or the state of "oversteering" and/or the state of "understeering" is present, the reversible vehicle occupant protection means is actuated. After the critical driving state has ended, the actuated vehicle occupant protection system is deactivated.

As the safety requirements in vehicles increase, and given the increasing number of controllable and reversible vehicle occupant protection devices as preventative measure in a critical driving situation, a differentiated evaluation of the driving state or of the driving behavior is necessary.

Even if the control signal for actuating the reversible seat belt pretensioner is set only briefly when a critical driving situation is identified, the seat belt pretensioner remains tensioned until an associated release signal is set if the vehicle movement dynamics and physical and mechanical release conditions for the release of the seat belt pretensioner are met. A control signal for actuating the reversible seat belt pretensioner which is set only briefly is unsuitable for actuating further vehicle occupant protection devices (for example a seat which is dynamic in terms of vehicle movement), since the latter requires persistent actuation which lasts until a resetting condition has been met.

One object of the invention, therefore, is to provide an improved method and an apparatus of the type mentioned above which achieves reliable and precise control of the vehicle occupant protection means is made possible.

This and other objects and advantages are achieved by the method according to the invention, in which a reversible vehicle occupant protection device that which can be activated by a control signal, and thus moved into an operative position, before a collision occurs is deactivated only if the critical driving state ends, and also as a function of at least one further condition which represents at least one sensed, in particular controllable driving behavior or a driving state.

The advantage of this method is that the control signal is suitable for a plurality of controllable vehicle occupant protection systems, as a triggering signal which takes into account essentially all the possible critical driving situations (for example skidding, rolling over or emergency braking of the vehicle), and permits a differentiated actuation of a plurality of different vehicle occupant protection devices (for example, a seat belt pretensioner and/or a seat which is dynamic in terms of vehicle movement). The triggering control signal is set until a controllable driving behavior; in particular its preventative measure is activated by active closed-loop or open-loop control of a vehicle system. This provides improved vehicle occupant protection. Furthermore, the driver perceives the differentiated actuation of the various vehicle occupant protection devices which takes into account various driving situations, and is thus improved as being plausible.

In one preferred embodiment, a vehicle movement dynamics control system is monitored as a function of time and/or state for a further driving behavior which is to be sensed. In particular, the vehicle movement dynamics control system is monitored for nonactivation. In this context it is checked whether the vehicle movement dynamics control system is deactivated for a predefined time period of at least 1 sec. In other words, it is checked whether no intervention of the vehicle movement dynamics control system occurs for a time period of, for example, at least 1 sec. If so, an uncritical driving situation or an uncritical and thus controllable driving behavior is detected, and the control signal can thus be reset (deactivated) for preventative triggering of one or more vehicle occupant protection systems.

In order to detect a critical driving situation or a critical driving behavior, various vehicle movement dynamics control systems, such as a brake control system, particularly an antilock brake system, referred to as ABS, an electronic braking force distribution system (referred to as BFDM), an electronic stabilization program (referred to as ESP), or a traction controller (referred to as TC), are expediently monitored for deactivation and/or activation. In addition, in order to reset the control signal, a check is made whether there has been no intervention in one of these systems for at least 1 sec. This permits sufficiently good detection of a resumption of a controllable driving behavior or driving state, and of the sensation of risk of a vehicle user by derivation therefrom.

As a further condition, advantageously the yaw rate may be monitored for undershooting of a predefined first threshold value for a time period of at least 1 sec, in which case an uncritical driving state or an uncritical driving behavior is detected, and the control signal is deactivated. The first threshold value can be selected as a function of the vehicle speed, and for example decreased at high speeds. This facilitates resetting at high speeds, because it has been found empirically that drivers drive with a greater degree of attention at relatively high speeds.

Additionally or alternatively, it is possible in a further case to check as a further condition whether the wheels of the vehicle are stationary and a predefined second threshold value of the yaw rate continues to be undershot. For skidding or rotating of the vehicle when the wheels are stationary, the yaw rate is therefore also monitored as an evaluation variable. However, selecting different threshold values permits separate adaptation to the particular situation that the vehicle is rotating about the vertical axis while the wheels are stationary, which can occur when the underlying surface is slippery.

The undershooting of a threshold value is preferably monitored for a predefined time period, particularly for a time period of at least 1 sec. If the predefined threshold value is undershot for at least 1 sec, an uncritical driving situation is identified and the control signal is reset. If, on the other hand, the threshold value of the yaw rate is exceeded, rotation or skidding of the vehicle is identified.

As a further condition for resetting the control signal, it is possible to check whether no partial braking operation which is triggered by a driver and no autonomous partial braking operation (for example of a braking assistance system), is occurring. Autonomous partial braking operation is understood to be in particular an emergency braking operation which is triggered automatically in response to sensing of the surroundings. When a partial brake operation or emergency braking is triggered by a driver, it is concluded that a hazardous situation or emergency situation is present due to the driver's behavior. For this purpose, at least one parameter, such as the braking pressure, the speed of the activation of the brake pedal and the speed with which the acceleration pedal is released, is used to evaluate the braking process. If no partial braking operation is triggered by a driver and no autonomous partial braking operation occurs for a time period of at least 1 sec, an uncritical driving state is identified and the control signal is deactivated or reset.

By means of the acquired driving state data of one of the vehicle movement dynamics control systems or a sensor system and its monitoring for downward and/or upward transgression of threshold values it is possible to identify oversteering, understeering and/or emergency braking of the vehicle as critical driving states. For example, for this purpose changes in the steering angle, the speed of the vehicle, the wheel speed, the yaw rate, the lateral acceleration, the longitudinal acceleration, a resulting overall acceleration or an actual coefficient of friction are sensed and monitored for upward transgression and/or downward transgression of threshold values, in particular for a predefined time period.

If a critical driving situation occurs, it is possible, by means of the actuated control signal, to activate at least one reversible vehicle occupant protection system as a preventative measure for protecting the vehicle occupants. A reversible vehicle occupant protection means is one whose purpose is to reduce the stressing of a vehicle occupant in the case of a collision. In this context, the protection system can be changed repeatedly from the initial state to an operative state, and reset from the operative state back to the initial state. For example an electric seat adjustment device, a reversible seat belt pretensioner, an electric adjustment device for vehicle openings and/or an electrically adjustable impact protection device are activated as reversible vehicle occupant protection systems.

The device according to the invention has a control unit which can activate a control signal for triggering at least one vehicle occupant protection system if at least one critical driving state is present, and can be deactivated if the respective critical driving state ends and as a function of at least one further condition which represents at least one sensed driving behavior. The control unit continuously checks whether one of the critical driving states of oversteering, understeering or emergency braking is present. If so, one or more reversible vehicle occupant protection systems is activated. In particular, the activation of the vehicle occupant protection systems when more than one of the critical states of emergency braking, understeering and oversteering are present simultaneously, is adapted to a combined hazard. In order to deactivate the vehicle occupant protection system by resetting the triggered and set control signal, in addition to the ending of the identified critical driving situation, at least one further condition that is indicative of a controllable driving behavior of the vehicle, is used.

In one particular embodiment, the control unit outputs a control signal which corresponds to an identified state. The control signal, and the information which is associated with it about the states of "oversteering", "understeering" or "emergency braking", are also made available to other vehicle devices, for example for performing open-loop and/or closed-loop control over other operating functions of the vehicle.

The device preferably has a databus and the control unit transmits the control signal onto the databus. The control signal and the information about the states of "oversteering", "understeering" or "emergency braking" can thus be called via a uniform interface.

Other objects, advantages and novel features of the present invention will become apparent from the following detailed description of the invention when considered in conjunction with the accompanying drawings.

BRIEF DESCRIPTION OF THE DRAWINGS

Parts which corresponds to one another are provided with the same reference symbols in all the figures.

DETAILED DESCRIPTION OF THE DRAWINGS

Figure 1:
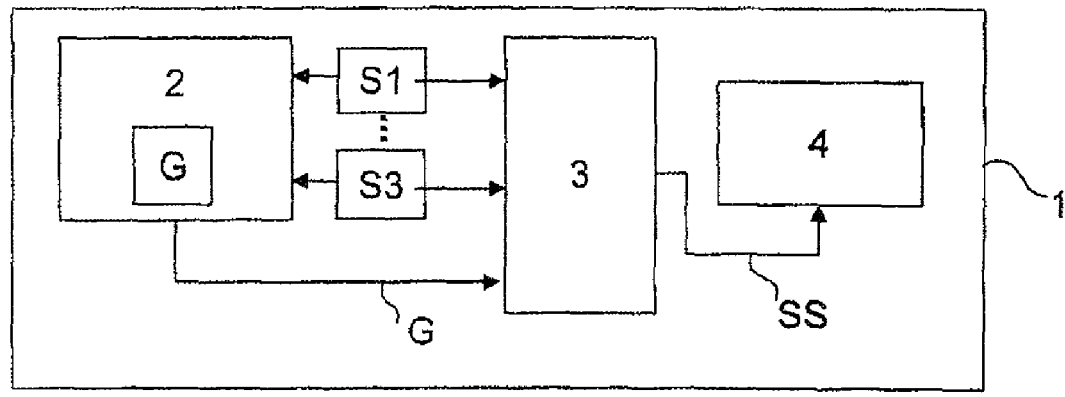
FIG. 1 is a block circuit diagram of a device according to the invention.

FIG. 1 is a schematic block circuit diagram which shows a vehicle 1 that is equipped with a vehicle movement dynamics control system 2. For example, the vehicle 1 comprises, as vehicle movement dynamics control system 2, one or more systems such as, for example, an antilock brake system, a traction controller, an electronic stability program, an electronic braking force distribution means and/or a brake control system.

The vehicle 1 also has at least one reversible vehicle occupant protection devices 4 which is connected to a control unit 3. For example a seat belt pretensioner, an electric seat adjustment device, an electric adjustment device for vehicle openings and/or an electrically adjustable impact protection device serve as vehicle occupant protection device 4. The one or more vehicle occupant protection device 4 are reversible; that is, they can be changed repeatedly from an initial state, to an operative state and reset again.

The illustrated connection of the control unit 3 to the vehicle movement dynamics control system 2 and/or to the vehicle occupant protection means 4 may be provided for example, via a databus and/or a control line.

The vehicle movement dynamics control system 2 determines vehicle state data, for example an actual yaw rate, the set point yaw rate, a lateral acceleration, a longitudinal acceleration, the velocity, the wheel speed of the vehicle 1, by means of a number of sensors S1 to S3. For example an acceleration sensor, a steering angle sensor, a yaw rate sensor, a lateral acceleration sensor and/or a rotational speed sensor are provided as the sensor system or sensors S1 to S3 and they are, if appropriate, evaluated in a combined fashion for the acquisition of further driving state data.

A critical driving situation or a critical driving state, for example oversteering or understeering of the vehicle or emergency braking, is determined from the deviation between the set point values and actual values for the acquired driving state data or from the upward and/or downward transgression of predefined threshold values. For example, by means of the vehicle movement dynamics control system 2, oversteering of the vehicle 1 is identified if the rear of the vehicle veers off, and a dangerous driving state could occur.

If such a critical driving situation is detected, the one or more vehicle occupant protection devices 4 are actuated by the control unit 3 (for example for the case of oversteering or oversteering) by evaluating the manipulated variable G of the vehicle movement dynamics control system 2. A high value of the manipulated variable G is, for example, an indicator of strong oversteering or of a risk of strong oversteering of the vehicle and causes the control signal SS to be set.

Figure 2:
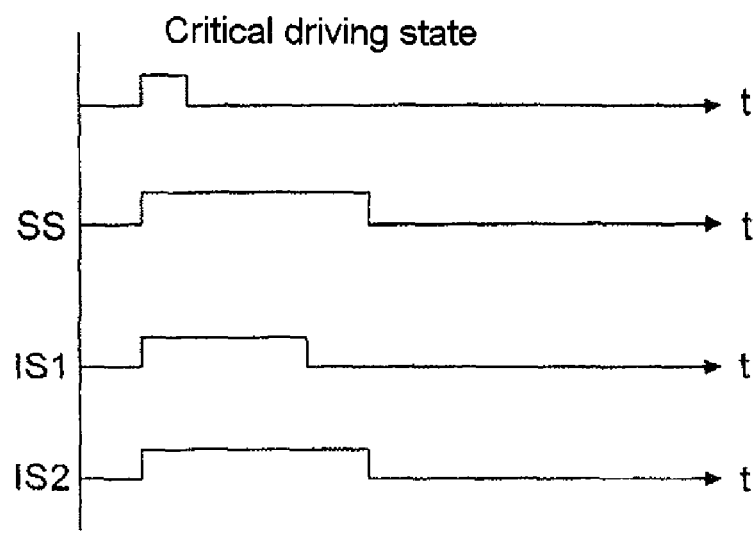
FIG. 2 is a time diagram that illustrates operation of the method according to the invention.

FIG. 2 shows an example of a time diagram of the setting and resetting of the control signal SS by means of the control unit 3.

The first signal "critical driving state" exhibits a comparatively short pulse which comes about if, for example, the brake pedal is depressed with a high activation speed, which points to critical longitudinal dynamics. Critical lateral dynamics would be indicated, for example, in the case of severe understeering if, when traveling through a tight bend (i.e., when there is high lateral acceleration), the driver turns the steering wheel even further so that the vehicle is pushed over the front wheels. The driver would quickly correct the driving behavior so that the pulse which indicates the critical state would be of only a short duration, as indicated in FIG. 2. Since this pulse is very short (can be set only for one cycle), it may be possible sufficient for triggering a reversible seat belt pretensioner, but not for actuating various other vehicle occupant protection devices 4, (for example a seat which is dynamic in terms of vehicle movement). Resetting of this pulse also does not necessarily mean that the hazardous situation is also passed.

According to the invention, the control signal (SS) is triggered in order to trigger the vehicle occupant protection devices by the short pulse for the critical state. The control signal SS (also referred to as flag for evaluating the driving situation) is reset, however, after the end of the triggering driving state and as a function of at least one further condition which is indicative of a controllable driving behavior. This ensures that vehicle occupant protection means can be placed in the operative position until it is certain that the driving state of the vehicle is under the control of the driver again. For this reason, the control signal SS or the flag which has been set again, for the driving state "understeering" or "oversteering" of the vehicle for example, is set until the driving situation for the driver is plausibly classified as no longer critical.

The control signal SS is reset if:
the critical driving situation which has led to the triggering no longer applies (1st signal profile in FIG. 2); and
at least one further condition which is indicative of a controllable driving behavior is present (for example if one or both information signals IS1 and/or IS2 is/are no longer activated in FIG. 2).

The information signals IS1 and IS2 indicate conditions for the prolonging of the control signal SS. They can be logically combined, for example, in such a way that the control signal SS is reset only if both conditions no longer apply. A number of exemplary embodiments of the sensing of such conditions and the determination of a controllable driving behavior which has occurred again are described below.

The information signal IS1 could, for example, indicate that a specific waiting time (for example, 1 sec) has not yet expired since deactivation of a vehicle movement dynamics control system. The driving situation is therefore classified as uncritical only if no ABS and ESP control has taken place for at least one second. For the presence of an uncritical driving situation it is therefore necessary to check whether no intervention of a vehicle movement dynamics control system 2 (for example no ABS control and no ESP control) has taken place for at least a time period of 1 sec.

The information signal IS2 could indicate, for example, whether the vehicle is still traveling at a high lateral acceleration. In the case of a traveling vehicle with rotating wheels it is therefore checked whether the absolute value of the sensed yaw rate is below a predefined threshold value for at least one sec.

Taking the following equation as a basis for a steady-state circular turn:

$$a_y = v_{vehicle} * v_{Gi} \quad [1]$$

the undershooting of the predefined threshold value is monitored according to:

$$ABS(v_{Gi}) < MIN(V_{Gi\_max}, a_{y\_max}/v_{vehicle}) \quad [2]$$

for at least 1 sec
where $a_y$=lateral acceleration,
$v_{vehicle}$=vehicle speed,
$v_{Gi}$=yaw rate,
$ABS(v_{Gi})$=absolute value of the measured yaw rate, and
$MIN(u, v)$=minimum from arguments u and v.
The threshold value is thus obtained from the minimum of a constant $v_{Gi\_max}$=for example 60°/sec and a speed-dependent term with the constant $a_{y, max}$=for example 6m/sec². The threshold value thus decreases as the vehicle speed increases.

If the wheels of the vehicle are stationary (which can be detected by means of an evaluation of wheel speeds), the vehicle can nevertheless be in a critical driving situation if it rotates about the vertical axis. For this reason, in a parallel decision path for the case of stationary wheels and for the ending of the uncritical driving situation, it is checked whether the yaw rate drops below a predefined threshold value according to:

$$ABS(v_{Gi}) < v_{Gi\_min} \quad [3]$$

where $ABS(v_{Gi})$=absolute value of the measured yaw rate, and
$v_{Gi\_min}$=predefined minimum value for the yaw rate,
for example 10°/sec.

With this comparatively low threshold, the requirements for the resetting of the preventatively triggered protection means are set very high if the vehicle rotates about the vertical axis on, for example, a slippery underlying surface and the wheels do not rotate if, for example, the ABS and the ESP can no longer control. Here, the vehicle skids with stationary wheels and the yaw rate is the only evaluation variable present.

When the critical driving state is based on triggered by a driver and/or via an autonomous brake system in which the braking is brought about by a predictive surroundings-sensing system, it is checked, as a separate condition for the ending of the critical driving situation and for the resetting of the control signal SS, whether both the emergency braking of the driver and the emergency braking of the autonomous brake system are no longer active for at least 1 sec. By means of the various abovementioned time-dependent and state-dependent conditions, which are used individually or in combination to reset the control signal SS, it is also ensured that in the case of an autonomous braking intervention the control signal SS is not immediately aborted when there is a brief loss of the object if at least one further vehicle movement dynamics criterion, represented by the associated information signals IS1, IS2 to ISn, is still met for the continued presence of a critical situation. PRE-SAFE actions (i.e., preventative protection measures), are therefore not aborted immediately when there is a brief loss of object if the vehicle movement dynamics criteria have not yet been met.

If an avoidance maneuver or the like occurs subsequent to an emergency braking operation, and if a controllable driving behavior occurs only after such maneuver, the control signal SS is also not reset until after the expiration of the predefined time period (for example, after at least 1 sec has passed). The vehicle movement dynamics resetting conditions therefore do not come into play until after the abovementioned time condition has expired, even though the critical driving state was originally not triggered by a vehicle movement dynamics criticality, but rather by an emergency braking operation.

An equivalent embodiment in the sense of the invention is that the resetting of the vehicle occupant protection means is not brought about by deactivation of the same signal which previously brought about the triggering, but rather by a separate resetting signal which is subject to the same resetting conditions as have been presented above.

Of course, it is also possible to depart from the value which is specified with the waiting time of 1 sec without departing substantially from the teaching of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Vehicle
2 Vehicle movement dynamics control system
3 Control unit
4 Vehicle occupant protection means
S Manipulated variable
IS Information signal
SS Control signal

The invention claimed is:

1. A method for actuating a vehicle occupant protection device in a vehicle that has a sensor system which acquires driving state data, wherein the vehicle occupant protection device is reversible, and can be triggered before a collision time and thus moved into an operative position said method comprising:
if at least one first condition that is indicative of a critical driving state is detected, activating a control signal for triggering the vehicle occupant protection device; and
deactivating the control signal, and initiating a resetting of the vehicle occupant protection device to an initial state, if both
i) the detected at least one first condition indicative of a crucial driving state ends; and
ii) at least one further condition that is indicative of a return to controllable driving behavior is detected, wherein,
in order to sense a return to controllable driving behavior, a vehicle movement dynamics control system is monitored as a function of one of time and state, to detect a non-activated status; and
said monitoring comprises checking whether the vehicle movement dynamics control system remains non-activated for a predefined time period.

2. The method as claimed in claim 1, wherein the vehicle occupant protection system comprises at least one of an electric seat adjustment device, a reversible seat belt pretensioner, an electric adjustment device for vehicle openings and/or an electrically adjustable impact protection device.

3. Apparatus for performing the method as claimed in claim 1, said apparatus comprising:
a vehicle occupant protection device; and
a control unit; wherein,
the control unit generates a control signal for triggering the vehicle occupant protection device upon detection of at least one first condition that is indicative of a critical driving state;
the control unit deactivates the control signal if both
i) at least one first condition is indicative of a critical driving state ends; and
ii) at least one further condition that indicates a return to controllable driving behavior is detected;
the vehicle occupant protection device is reset to an initial state, in response to deactivation of the control signal;
in order to sense a return to controllable driving behavior, a vehicle movement dynamics control system is monitored as a function of one of time and state, to detect a non-activated status; and
said monitor comprises checking whether the vehicle movement dynamics control system remains non-activated for a predefined time period.

4. The method as claimed in claim 1, wherein at least one of oversteering, understeering of a state and emergency braking is identified as a critical driving state by reference to driving state data.

5. The method according to claim 4, wherein said driving state data comprises one of changes in steering angle, speed of the vehicle, wheel speed, yaw rate, lateral acceleration, longitudinal acceleration, a resulting overall acceleration and an actual coefficient of friction.

6. The method as claimed in claim 1, wherein said predefined time period is at least one second.

7. The method as claimed in claim 1, wherein said vehicle movement dynamics control system comprises at least one of a brake control system, an electronic braking force distribution system, an electronic stabilization program and a traction controller, which is monitored for activation and/or deactivation.

8. The method as claimed in claim 1, wherein:
in order to sense a return to controllable driving behavior, the vehicle is monitored for stationary wheels; and
if stationary wheels are detected, the absolute value of the yaw rate is monitored for undershooting of a second predefined threshold value.

9. The method as claimed in claim 1, wherein in order to sense a return to controllable driving behavior, at least one of a partial braking operation which is triggered by a driver and an autonomous partial braking operation are monitored as a function of at least one of time and state.

10. The method as claimed in claim 9, wherein it is checked whether the at least one of partial braking operation triggered by a driver and the autonomous partial braking operation, is deactivated for a predefined time period.

11. A method for actuating a vehicle occupant protection device in a vehicle that has a sensor system which acquires driving state data, wherein the vehicle occupant protection device is reversible, and can be triggered before a collision time and thus moved into an operative position said method comprising:

if at least one critical driving state is detected, activating a control signal for triggering the vehicle occupant protection device; and if the detected critical driving state ends, deactivating the control signal, and initiating a resetting of the vehicle occupant protection device to an initial state; wherein the control signal is deactivated as a function of at least one further condition which represents at least one sensed controllable driving behavior; and in order to sense the controllable driving behavior, the absolute value of the yaw rate is monitored to detect undershooting of a first predefined threshold value.

12. The method as claimed in claim 11, wherein it is checked whether the predefined threshold value continues to be undershot for a predefined time period.

13. The method as claimed in claim 12, wherein said predefined time period is at least one second.

* * * * *